United States Patent
Horie

(10) Patent No.: US 8,634,664 B2
(45) Date of Patent: Jan. 21, 2014

(54) IMAGE PROCESSING DEVICE, IMAGE TRANSMITTING DEVICE, IMAGE PROCESSING METHOD, AND IMAGE PROCESSING PROGRAM STORAGE MEDIUM

(75) Inventor: Daigo Horie, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 553 days.

(21) Appl. No.: 12/945,281

(22) Filed: Nov. 12, 2010

(65) Prior Publication Data

US 2011/0292458 A1 Dec. 1, 2011

(30) Foreign Application Priority Data

May 25, 2010 (JP) .................. 2010-119401

(51) Int. Cl.
*G06K 9/36* (2006.01)
(52) U.S. Cl.
USPC ........................................ 382/232
(58) Field of Classification Search
USPC .......... 382/176, 232–250, 284; 358/448, 474, 358/540, 450, 426.01–426.16; 715/200–205
See application file for complete search history.

(56) References Cited

U.S. PATENT DOCUMENTS

| 6,336,124 B1 * | 1/2002 | Alam et al. ................. 715/205 |
| 6,453,073 B2 * | 9/2002 | Johnson ..................... 382/239 |
| 7,835,037 B2 * | 11/2010 | Koide ......................... 358/474 |
| 2007/0188823 A1 * | 8/2007 | Koide ......................... 358/448 |

FOREIGN PATENT DOCUMENTS

JP 2004-32262 A 1/2004

* cited by examiner

*Primary Examiner* — Ishrat I Sherali
(74) *Attorney, Agent, or Firm* — Sughrue Mion, PLLC

(57) ABSTRACT

An image processing device includes a generator. By using compressed image data which is obtained by compressing image data that have been obtained by reading a document with a reading unit, and combinational data, which represent an image or text to be combined with an image represented by the image data, the generator generates a single file by combining the compressed image data and the combinational data without decompressing the compressed image data, so that the compressed image data and the combinational data are held in separate layers.

10 Claims, 4 Drawing Sheets

IMAGE PROCESSING DEVICE, IMAGE
TRANSMITTING DEVICE, IMAGE
PROCESSING METHOD, AND IMAGE
PROCESSING PROGRAM STORAGE
MEDIUM

CROSS-REFERENCE TO RELATED
APPLICATION

This application is based on and claims priority under 35 USC 119 from Japanese Patent Application No. 2010-119401 filed on May 25, 2010.

BACKGROUND

1. Technical Field

The present invention relates to an image processing device, an image transmitting device, an image processing method, and an image processing program storage medium.

2. Related Art

Techniques for combining uncompressed image data and compressed image data that have been compressed by a compression method including performing a discrete cosine transform per image block, by once decompressing the compressed image data and then combining with the uncompressed image data, have conventionally been proposed.

SUMMARY

One aspect of the present invention is an image processing device including: a generator that, by using compressed image data that is obtained by compressing image data that have been obtained by reading a document with a reading unit, and combinational data, which represent an image or text to be combined with an image represented by the image data, generates a single file in which the compressed image data as is and the combinational data are held in separate layers. That is, the generator generates the single file by combining the compressed image data and the combinational data without decompressing the compressed image data, so that the compressed image data and the combinational data are held in separate layers.

BRIEF DESCRIPTION OF THE DRAWINGS

An exemplary embodiment of the present invention will be described in detail based on the following figures, wherein.

DETAILED DESCRIPTION

Figure 1:
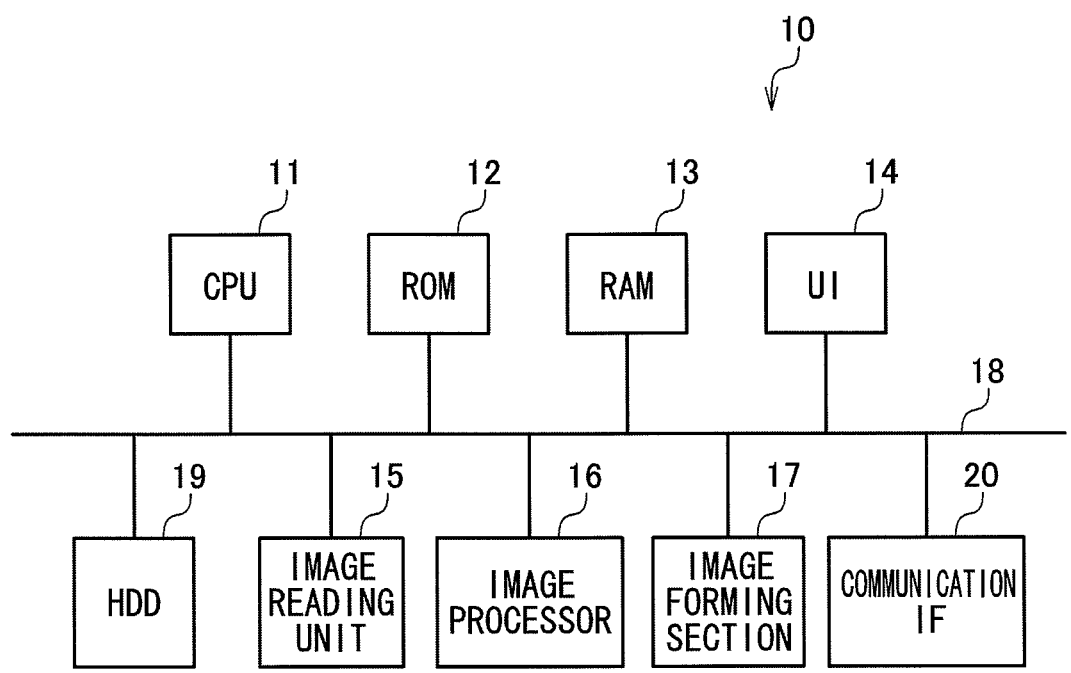
FIG. 1 is a diagram showing one example of the configuration of an image forming apparatus including an image transmitting function pertaining to the exemplary embodiment.

FIG. 1 is a diagram showing one example of the configuration of an image forming apparatus 10 including an image transmitting function pertaining to the exemplary embodiment.

The image forming apparatus 10 has a central processing unit (CPU) 11, a read-only memory (ROM) 12, a random access memory (RAM) 13, a user interface (UI) 14, an image reading unit 15, an image processor 16, an image forming section 17, a hard disk drive (HDD) 19, and a communication interface (IF) 20. These are interconnected via a bus 18.

The CPU 11 executes programs stored in the ROM 12 or the HDD 19 and controls the operation of the entire image forming apparatus 10. Programs executed by the CPU 11 and data needed for processing by the CPU 11 are stored in the ROM 12. The RAM 13 is used as a work memory and the like.

The storage medium for storing the programs executed by the CPU 11 is not limited to the ROM 12 or the HDD 19. For example, the storage medium may also be a flexible disk, a DVD disk, a magneto-optical disk, or a universal serial bus (USB) memory (not shown).

The UI 14 is configured from a touch panel display, which is configured by a touch panel overlaid on a display, and operation buttons, for example. Various types of information are displayed on the UI 14, and various information and settings are inputted to the UI 14 as a result of a user operating the UI 14.

The image reading unit 15 has the function of a scanner that reads an image of a document. For example, the image reading unit 15 reads, with an imaging element such as a charge coupled device (CCD) or a complementary metal oxide semiconductor (CMOS), a document that has been placed on an unillustrated platen glass or conveys to the imaging element and reads documents that have been placed in an automatic document feeder. Image data (e.g., of each color of R, G, and B) obtained by reading are temporarily stored in the RAM 13.

Image data that have been inputted from the outside via the communication IF 20 and image data that have been obtained by reading an image of a document with the image reading unit 15 are inputted to the image processor 16. The image processor 16 administers predetermined image processing on the inputted image data.

The image forming section 17 is a print engine that forms an image on the basis of the image data that have been image-processed by the image processor 16. The image forming section 17 includes a Y-image forming unit that forms a yellow (Y) color image, an M-image forming unit that forms a magenta (M) color image, a C-image forming unit that forms a cyan (C) color image, a K-image forming unit that forms a black (K) color image, an intermediate transfer belt, primary transfer units, a secondary transfer unit, and a fixing device. The Y-image forming unit, the M-image forming unit, the C-image forming unit, and the K-image forming unit are arranged in tandem from an upstream side to a downstream side along a process direction. Each of the Y-image forming unit, the M-image forming unit, the C-image forming unit, and the K-image forming unit is equipped with a photoconductor, a charging device that charges the surface of the photoconductor, an exposure device that exposes the charged photoconductor to light on the basis of the corresponding image data to form an electrostatic latent image on the photoconductor, and a developing device that causes a toner of the color corresponding to that image forming unit to adhere to the surface of the photoconductor on which the electrostatic latent image has been formed to thereby develop the electrostatic latent image. The toner images that have been developed by the developing devices of the image forming units are transferred from the photoconductors to the intermediate transfer belt and superimposed on top of each other by the primary transfer units that are disposed for each of the image forming units. Moreover, the toner images on the intermediate transfer belt are electrically drawn to and transferred on recording paper by the secondary transfer unit. The toner images that have been transferred to the recording paper are fixed to the recording paper by the fixing device.

Here, an image forming section using an intermediate transfer belt is exemplified and described, but embodiments are not limited thereto and the toner images may also be directly transferred to the recording paper without the intervention of an intermediate transfer belt. Further, here, a tandem electrophotographic image forming section is exemplified, but the image forming section is not limited to this and may also be an image forming section where a rotary developing device is disposed, for example. That is, the image forming section may also be an image forming section equipped with one photoconductor, one charging device, one exposure device, and a developing device that supplies toners of each color of Y, M, C, and K, with the image forming section forming toner images of each color in order by forming electrostatic latent images on the basis of image data per each color of Y, M, C, and K on the photoconductor that has been charged by the charging device and developing the electrostatic latent images with the toners, and with the image forming section sequentially transferring the toner images of each color to an intermediate transfer belt, superimposing the toner images on top of each other, transferring the superimposed toner images to recording paper, and fixing the toner images to recording paper. Further, the image forming section is not limited to an electrophotographic image forming section and may also be inkjet image forming section that ejects ink droplets of per each color of Y, M, C, and K in accordance with image data of per each color of Y, M, C, and K from a recording head and prints on the recording paper while conveying the recording paper.

The HDD 19 functions as an accumulating unit for accumulating various data.

The communication IF 20 is connected to an external device (e.g., another image forming apparatus 10, a personal computer (PC), etc.) via a communicating unit. The communicating unit may be a public line or a network such as the Internet, a local area network (LAN), or a wide area network (WAN). The communicating unit may be a wireless communicating unit or a wired communicating unit.

Figure 2:
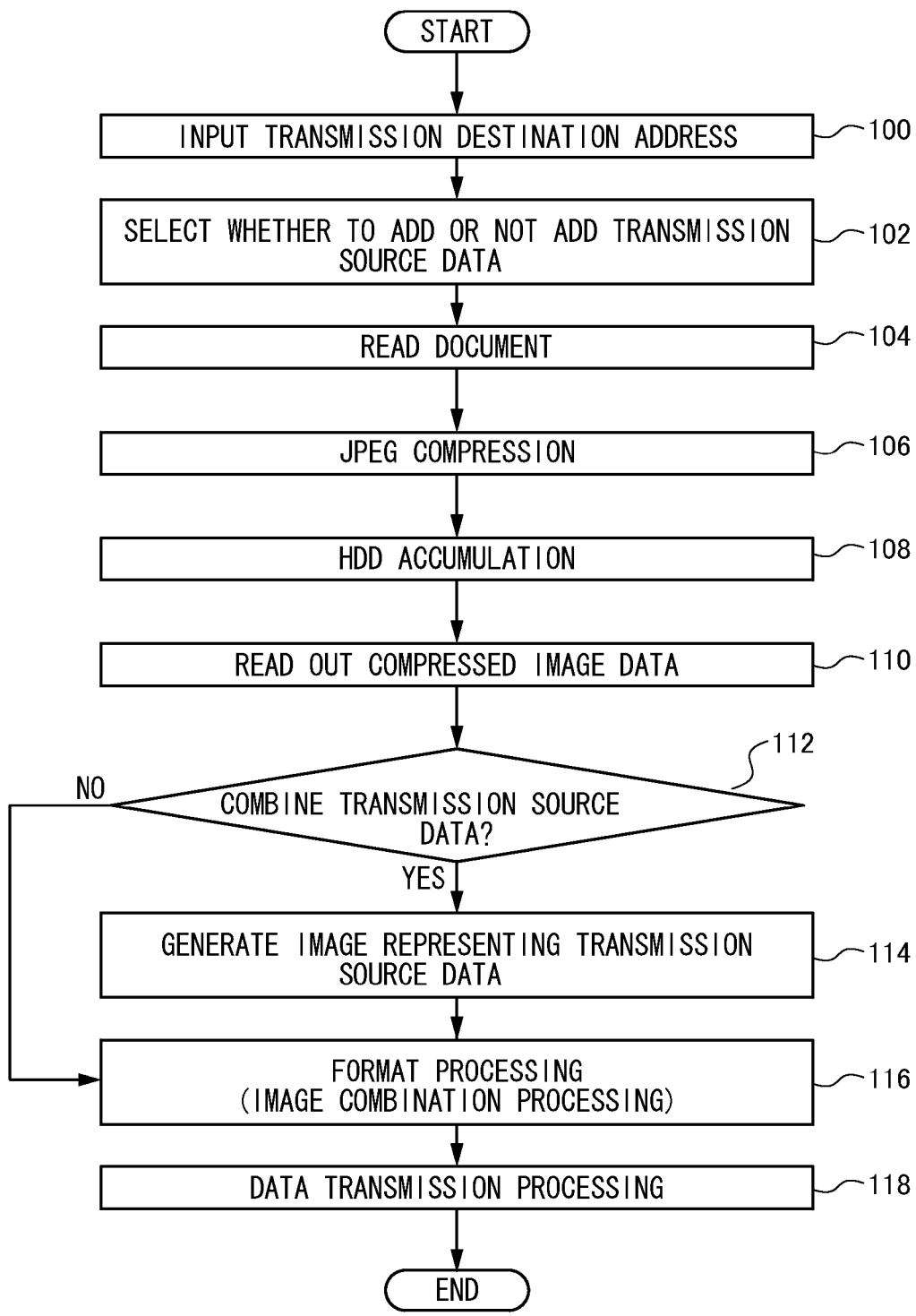
FIG. 2 is a flowchart showing a processing routine that is performed as a result of a CPU executing a program when transmitting an image that has been read by an image reading unit to an external device.

FIG. 2 is a flowchart showing a processing routine that is executed as a result of the CPU 11 executing a program when transmitting to the external device an image that has been read by the image reading unit 15.

In step 100, a setting screen for inputting a transmission destination address is displayed on the UI 14 and the user is made to input a transmission destination address. The inputted transmission destination address is saved in the RAM 13 or in the HDD 19 as setting information (data) needed for transmission processing.

Figure 3:
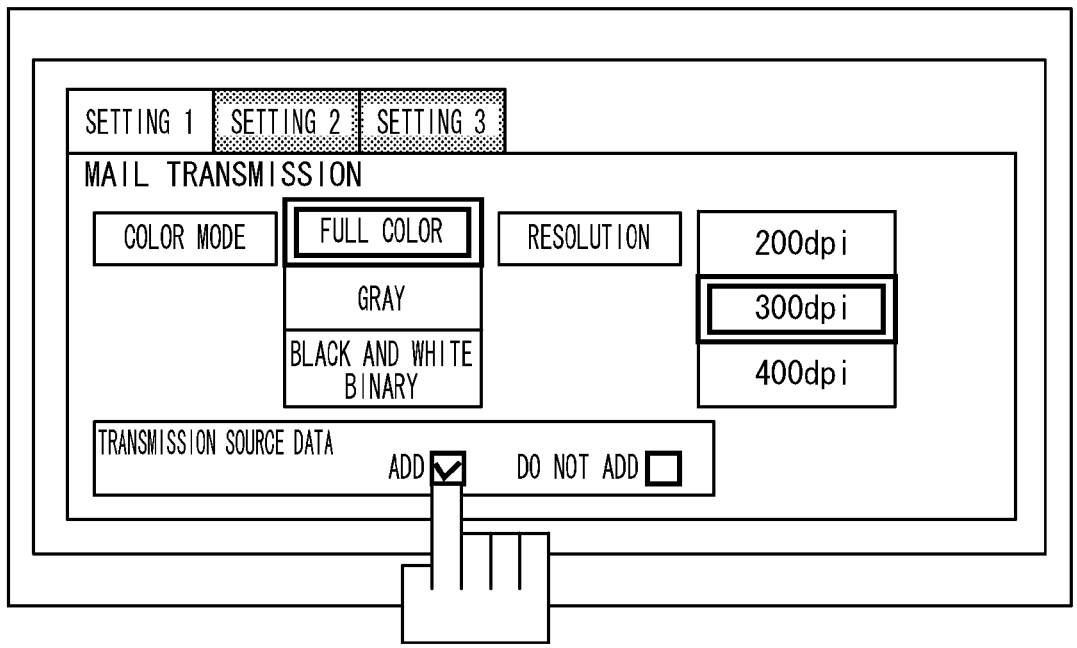
FIG. 3 is a diagram showing one example of a setting screen.
Figure 4:
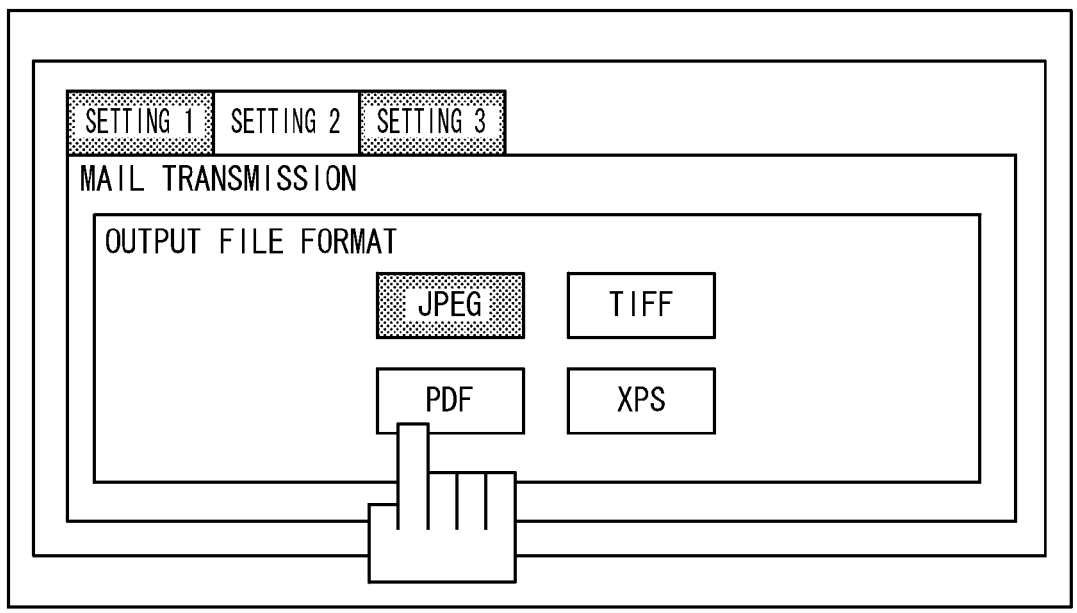
FIG. 4 is a diagram showing another example of the setting screen.

In step 102, a setting screen for selecting whether or not to add transmission source information (data) to an image to be transmitted to the transmission destination address is displayed on the UI 14, and the user is made to select whether or not to add transmission source data. FIG. 3 shows one example of the setting screen (setting 1). In step 102, a setting screen for designating the file format of the image to be transmitted to the transmission destination address is displayed on the UI 14, and the user is made to select the file format. FIG. 4 shows one example of the setting screen (setting 2). In this setting screen (setting 2), plural images corresponding to plural file formats are displayed. When the user selects (here, when the user touches) any of those plural images, the file format corresponding to the selected image is selected.

Here, the transmission source data is data such as the date and time of transmission and transmission device information (data), which may be added as a header onto the image to be transmitted. Of the transmission source data, data other than that changed in real time, such as the date and time of transmission, is set (e.g., saved in the HDD 19 or the like) beforehand in the image forming apparatus 10.

When a selection has been made to add transmission source data in the setting screen (setting 1) for selecting whether or not to add transmission source data, then in the setting screen (setting 2), only file formats capable of carrying plural sets of data as separate layers (hereinafter called "file formats that can have (hold) a layer structure") are displayed so as to be selectable and all other file formats are displayed so as to be unselectable. That is, the file formats that the user can select are restricted to file formats that can have a layer structure. In the example shown in FIG. 4, the JPEG format is unselectable. The selection result of the file format selected in this manner is saved in the RAM 13 or in the HDD 19 as setting data needed for transmission processing.

Thereafter, when the user presses a start button, the processing routine advances to step 104.

In step 104, the image reading unit 15 performs reading of an image of a document. Hereinafter, the image data that have been obtained by reading an image of a document will be called first image data, and the image represented by the first image data will be called a first image.

In step 106, compressed image data, in which the first image data have been compressed in an irreversible compression format (here, the JPEG format), is generated.

In step 108, the compressed image data is stored or accumulated in the HDD 19. The compressed image data may also be stored or accumulated in the RAM 13.

In step 110, the compressed image data that have been stored are read out.

In step 112, a determination of whether or not to combine image data representing an image of the transmission source data (whether or not to add the transmission source data to the image that has been read) is made on the basis of the setting data.

When the determination is affirmative in step 112, the processing routine advances to step 114. When the determination is negative in step 112, the processing routine skips step 114 and advances to step 116.

In step 114, image data of an image representing the transmission source data is generated. Hereinafter, the image data that have been generated in step 114 will be called second image data, and the image represented by the second image data will be called a second image. The second image is overlaid on top of the first image (so that when the file is opened at the transmission destination as described later, the second image is displayed and printed in a state where it has been overlaid on top of the image represented by the decompressed image of the compressed image data), and the region of the first image on which the second image is to be overlaid (overlying position) is predetermined. Hereinafter, the image represented by the decompressed image data of the compressed image will be called a decompressed image.

In step 116, format processing is performed. Here, the format processing is processing that generates, as a file for transmission, a file of the file format that has been selected on the setting screen (setting 2).

The format processing will be described in detail below. When the determination is affirmative in step 112, the second image data are generated in step 114, and the processing routine advances to step 116, then the compressed image data and the second image data are combined by generating a single file of the selected file format in which the compressed image data in its compressed state and the second image data are held as separate layers. This is to be the file for transmission. A draw command, in which the overlay order when the first image and the second image are overlaid on each other and the overlying position where the second image is to be overlaid have been designated, is also included in the file.

When the determination is negative in step 112 and the processing routine advances to step 116, it is not necessary to combine the second image data with the compressed image data. Consequently, for example, when the selected file format is a file format that can hold a layer structure such as PDF, a single file in which the compressed image data in its compressed state are held as a single layer is generated as the file for transmission. When the selected file format is JPEG, the JPEG format compressed image data are handled as is as the file for transmission.

In step 118, the file for transmission that has been generated by the format processing is transmitted to the inputted transmission destination address via the communication IF 20.

When the transmitted file is opened at the transmission destination of the file, the compressed image data are decompressed by a decompression format corresponding to the compression format, and the file is opened in a state where the second image represented by the second image data have been overlaid in the overlying position on top of the decompressed image represented by the decompressed image data. This function of opening a file is a common function in software that handles file formats that hold a layer structure such as PDF.

Consequently, when the file is opened at the transmission destination and displayed on the UI, an image where the second image has been overlaid on the decompressed image is displayed, and when the file is opened and printed, an image where the second image has been overlaid on the decompressed image is printed.

Figure 5:
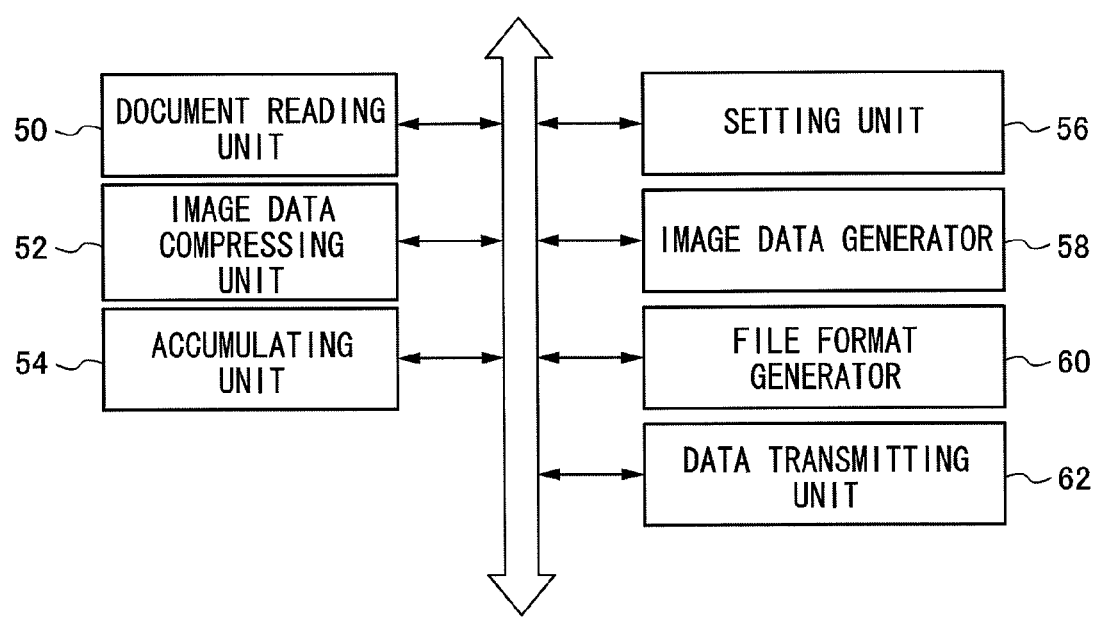
FIG. 5 is a block diagram showing the functional configuration of the image forming apparatus.

FIG. 5 is a block diagram showing the functional configuration of the image forming apparatus 10 pertaining to the exemplary embodiment described above.

A document reading unit 50 corresponds to the image reading unit 15 and reads an image of a document (see also step 104). An image data compressing unit 52 compresses the first image data that have been obtained by reading with the document reading unit 50 and generates the compressed image data (which corresponds to step 106). An accumulating unit 54 corresponds to the HDD 19 or the like and accumulates the compressed image data (see also step 108). A setting unit 56 displays various setting screens on the UI 14 to allow the user to input and select information (data) needed for transmission and maintains (stores) this information as the setting data (which corresponds to steps 100 and 102). An image data generator 58 generates the second image data (which corresponds to step 114). A file format generator 60 performs the format processing (which corresponds to step 116). A data transmitting unit 62 transmits to the transmission destination address the file for transmission that has been generated by the file format generator 60 (which corresponds to step 118).

In the exemplary embodiment described above, an example has been described where each of the functions shown in FIG. 5 other than those of the document reading unit 50 and the accumulating unit 54 are realized as a result of the CPU 11 executing a program and performing the processing routine described above, but the exemplary embodiment is not limited to this. For example, each of the functions shown in FIG. 5 may also be realized by hardware. For example, the functions of the image data compressing unit 52, the image data generator 58, and the file format generator 60 may be provided by the image processor 16.

The exemplary embodiment may also be configured such that the user does not select the file format in step 102. For example, a file format (that can hold a layer structure) when adding transmission source data and a file format when not adding transmission source data are determined beforehand, and a file of the file format determined beforehand may be generated in step 116.

In the exemplary embodiment described above, an example has been described where the compressed image data, in which image data that have been obtained by reading an image of a document with the image reading unit 15, are transmitted, but embodiments are not limited to this. The compressed image data may be accumulated beforehand in the HDD 19 or may be received from the external device.

In the exemplary embodiment described above, an example has been described where the second image data are generated in step 114, but when data that changes depending on the transmission timing, such as the date and time of transmission, is not to be included in the transmission source data, the exemplary embodiment may be configured such that the second image data are generated or inputted from the outside and saved beforehand, the second image data that have been saved are used, and the processing of step 114 is omitted.

In the exemplary embodiment described above, an example has been described where the second image data are combined without being compressed in step 116 (that is, where a file holding a layer structure in which the second image data are stored in a layer separate from the layer of the compressed image data is generated), but the exemplary embodiment may also be configured such that second compressed image data, in which the second image data have been compressed, are combined. That is, the exemplary embodiment may also be configured such that a single file in which the (first) compressed image data is generated in which the first image data have been compressed and the second compressed image data are stored respectively in separate layers.

In the exemplary embodiment described above, an example has been described where the overlying position where the second image is to be overlaid is a predetermined position, but the exemplary embodiment may also be configured such that a setting screen for designating the overlying position is displayed on the UI 14 so that the user can designate the overlying position. In this case, in step 116, the file for transmission is generated including a draw command in which a designation of the position designated by the user as the overlying position where the second image is to be overlaid is included.

For example, the exemplary embodiment may be configured such that the user can select, as the overlying position, in the setting screen for designating the overlying position any of the upper margin, the lower margin, the left margin, or the right margin in the decompressed image when the file for transmission is opened at the transmission destination and is displayed on a display of a computer or the like. For example, the orientation of the first image represented by the first image data obtained by reading changes depending on the placement of the document when reading the document with the image reading unit 15, so the orientation of the image when the file is finally opened at the transmission destination changes. Consequently, by designating the region in which the second image is to be overlaid in a state where the file has been opened at the transmission destination, the file for transmission is generated with the overlying position and a rotate image command being included in the draw command such that the second image is displayed overlaid in the designated region. Thus, an image following the intent of the user is displayed at the transmission destination.

When plural documents are read and transmitted, image data in regard to an image of each page (here, one document corresponds to one page) are obtained by reading with the image reading unit 15. When the second image data are to be combined with respect to the compressed image data in which these sets of image data of each page have been compressed, the second image data may be combined with the compressed image data of each page. A file format holding a layer structure holds information (data) of a layer structure per each page. Consequently, when the second image data are to be combined with the compressed image data of each page, in step 116, a single file that carries, per each page, data of a layer structure where the compressed image data and the second image data are held in separate layers is generated. Alternately, the user may designate, via the UI 14, the page with which the user wants to combine the second image data, so that the second image data are combined only with the compressed image data of the designated page. In this case, in step 116, a single file is generated in which, for the designated page, holds data of a layer structure where the compressed image data of the designated page and the second image data are held in separate layers, and for pages other than the designated page, holds data of a layer structure of only the layer of the compressed image data of those pages.

In the exemplary embodiment described above, an example has been described where image data of an image representing transmission source data are combined, but embodiments are not limited to this. An embodiment may be configured such that, instead of image data representing transmission source data, image data representing information (data) other than transmission source data or image data of a predetermined graphic or the like are combined.

For example, text data may be combined instead of image data. This text data is not limited to transmission source data and may also be text data inputted by the user or predetermined text data, for example. Even when text data is combined, similar to the embodiment described above, in step 116, the file for transmission including data of a layer structure is generated in which the text data is held in a layer separate from the compressed image data and a draw command of that text data is included.

When the file that has been generated in this manner is opened at the transmission destination of that file, the compressed image data are decompressed by a decompression format corresponding to the compression format, and the file is opened in a state where an image of the text representing the text data has been overlaid on top of the decompressed image represented by the decompressed image data. This function of opening a file is a common function in software that handles file formats holding a layer structure such as PDF.

Consequently, when the file is opened at the transmission destination and displayed on the UI, an image in which the image of the text representing the text data has been overlaid on the decompressed image is displayed, and when the file is opened and printed, an image in which the image of the text representing the text data has been overlaid on the decompressed image is printed.

In the present exemplary embodiment, an example has been described where a file holding a layer structure is generated as the file for transmission in step 116, but embodiments are not limited to this. For example, the exemplary embodiment may also be configured such that the file that has been generated in step 116 is not transmitted but is stored in a storage unit such as the HDD 19.

In the description above, an example has been described where, when a selection has been made to add transmission source data in the setting screen (setting 1) for selecting whether or not to add transmission source data, then in the setting screen (setting 2), only file formats that can hole a layer structure are displayed selectable and all other file formats are displayed unselectable, and the file formats that the user can select are limited to file formats that can hold a layer structure. However, embodiments are not limited to this. For example, an embodiment may be configured such that, even when a selection has been made to add transmission source data in the setting screen (setting 1), the file formats that the user can select are not limited to file formats that can hold a layer structure, and the setting screen (setting 2) may display file formats other than file formats that can hold a layer structure (the other file format, i.e., file formats that cannot hold a layer structure) to be selectable. When the transmission destination does not have software that can open a file of a file format holding a layer structure, for example, the user can select the other file format.

When a file format other than a file format that can hold a layer structure has been selected by the user in step 102, the determination is affirmative in step 112, and after the second image data have been generated in step 114, format processing such as described below is performed in step 116. For example, a case where the JPEG format has been selected in step 102 will be taken as an example.

First, the compressed image data are decompressed. Then, the generated second image data are combined with the decompressed image data. That is, rather than the image data being combined as separate layers, the image data are combined by generating a single set of image data in which the decompressed image data and the second image data have been overlaid on top of each other. Then, the generated image data are JPEG-compressed. This file of the compressed image data that have been JPEG-compressed is the file for transmission. Processing when a file format that can hold a layer structure has been selected by the user in step 102 is the same as in the exemplary embodiment described above, so description will be omitted.

When text data is to be combined instead of the second image data, first, image data representing the text data is generated and the compressed image data are decompressed. Then, the image data representing the text data are combined with the decompressed image data. Then, the generated image data are JPEG-compressed. This file of the decompressed image data is the file for transmission.

Thus, even when the device at the transmission destination is a device that cannot open data of a file format holding a layer structure, the file can still be transmitted in a file format that the device at the transmission destination can open, and the file can be received and displayed (or printed) at the transmission destination. When the device at the transmission destination is a device that can open a file of a file format holding a layer structure, an image can be transmitted in the file format that can hold a layer structure, and a high-quality image can be transmitted as compared to when the image is transmitted in a file format other than a file format that can hold a layer structure.

An another exemplary embodiment may be configured such that, for example, when a selection has been made to add transmission source data in the setting screen (setting 1) for selecting whether or not to add transmission source data in step 102, before the setting screen (setting 2) is displayed, a setting screen for selecting whether to transmit in a file format that can hold a layer structure or to transmit in other file format is displayed, so that the user is allowed to select either one. For the sake of convenience, this setting screen will be called a setting screen (setting 3).

When a selection to transmit in a file format that can hold a layer structure has been made in the setting screen (setting 3), then in the setting screen (setting 2), only file formats that can hold a layer structure are displayed selectable and all other file formats are displayed unselectable, so that the file formats that the user can select are limited to file formats that can hold a layer structure. When a selection to transmit in a file format other than a file format that can hold a layer structure has been made in the setting screen (setting 3), only the other file formats are displayed selectable and file formats that can hold a layer structure are displayed unselectable, so that the file formats that the user can select are limited to the other file formats.

Then, a file of the file format selected in the setting screen (setting 2) is generated in step 116. The method of generating the file is the same as described above, so further description here will be omitted.

Alternately, an exemplary embodiment may also be configured such that a single file format that can hold a layer structure and a single file format other than file formats that can hold a layer structure are decided beforehand, and the setting screen (setting 2) is not displayed after the setting on the setting screen (setting 3). By deciding the file formats beforehand, the file formats are uniquely identified when the setting in the setting screen (setting 3) is performed. Thus, a file of the file format corresponding to the setting of the setting screen (setting 3) is generated in step 116. The method of generating the file is the same as described above, so further description here will be omitted.

In the description above, the second image is described as an image representing transmission source data, but embodiments are not limited to this. The second image may also be an image other than an image representing transmission source data. Further, text data is not limited to transmission destination data as well.

What is claimed is:

1. An image processing device comprising:
   a setting unit that receives a selection of a user as to whether or not to include in a file combinational data that represents an image or text to be combined with image data that has been obtained by reading a document; and
   a generator that, if the setting unit receives a selection to include the combinational data in a file, generates a single file by combining compressed image data that is obtained by compressing the image data and the combinational data without decompressing the compressed image data, so that the compressed image data and the combinational data are held in separate layers.

2. The image processing device according to claim 1, further comprising: a reading unit that reads a document to obtain the image data; and
   a compressing unit that generates the compressed image data by compressing the image data that have been obtained by the reading unit.

3. The image processing device according to claim 1, further comprising:
   a first selecting unit that, if the received selection is to include the combinational data in a file, selects, from a plurality of file formats that can hold plural sets of data in separate layers, a file format of the file that is to be generated by the generating unit,
   wherein the generating unit generates the file in the file format that has been selected by the first selecting unit.

4. The image processing device according to claim 1, further comprising:
   a second generator that decompresses the compressed image data, generates combined image data in which the decompressed image data and the combinational data have been combined, and generates a file of combined compressed image data by compressing the combined image data,
   a second selecting unit for selecting either file generation by the generator or file generation by the second generator, and
   a control unit that performs control such that, in a case in which file generation by the generator has been selected, a file is generated by the generator and, in a case in which file generation by the second generator has been selected, a file is generated by the second generator.

5. An image transmitting device comprising:
   the image processing device according to claim 1; and
   a transmitting unit that transmits the file generated by the image processing device.

6. A non-transitory storage medium storing a program causing a computer to execute image processing, the image processing comprising:
   obtaining compressed image data by compressing image data that have been obtained by reading a document, and combinational data that represents an image or text to be combined with an image represented by the image data;
   receiving a selection of a user as to whether or not to include the combinational data in a file; and
   if the received selection is to include the combinational data in a file, generating a single file by combining the compressed image data and the combinational data without decompressing the compressed image data, so that the compressed image data and the combinational data are held in separate layers.

7. An image processing method comprising:
   obtaining compressed image data by compressing image data that have been obtained by reading a document, and combinational data that represents an image or text to be combined with an image represented by the image data;
   receiving a selection of a user at to whether or not to include the combinational data in a file; and
   if the received selection is to include the combinational data in a file, generating a single file by combining the compressed image data and the combinational data without decompressing the compressed image data, so that the compressed image data and the combinational data are held in separate layers.

8. The image processing device according to claim 1, wherein the combinational data comprises information of a transmission source of the file to be added as a header of the image data.

9. The non-transitory storage medium according to claim 6, wherein the combinational data comprises information of a transmission source of the file to be added as a header of the image data.

10. The image processing method according to claim 7, wherein the combinational data comprises information of a transmission source of the file to be added as a header of the image data.

* * * * *